United States Patent [19]
Sharaf

[11] 3,737,958
[45] June 12, 1973

[54] QUICK RELEASE LOCKING MECHANISM

[75] Inventor: Ernest S. Sharaf, Rockport, Mass.

[73] Assignee: Questor Corporation, Toledo, Ohio

[22] Filed: July 26, 1971

[21] Appl. No.: 166,092

[52] U.S. Cl. ......... 24/230 AK, 24/230 F, 248/221, 297/384
[51] Int. Cl.. A44b 19/00, F16m 13/02, A47c 31/00
[58] Field of Search ................ 24/230 A, 230 AK, 24/230 AL, 230 AV; 292/228, 238; 248/221, 230

[56] References Cited
UNITED STATES PATENTS

| 3,031,642 | 4/1962 | Gartner | 339/255 P |
| 2,988,135 | 6/1961 | Caminiti | 297/385 X |
| 435,597 | 9/1890 | Walder | 24/230.1 |
| 1,876,856 | 9/1932 | Clay | 292/238 |
| 2,774,411 | 12/1956 | Berlin | 297/385 X |
| 2,876,028 | 3/1959 | Shoup | 24/230 A |

Primary Examiner—Paul H. Gilliam
Attorney—Donald R. Bahr

[57] ABSTRACT

A quick release mechanism for a seat belt used with an infant's car seat. The belt is secured at one end to one upright post of the seat. The other upright post includes a rigid device having a pivoted finger which is resiliently biased towards the rigid device. The belt terminates in a flat plate having a hole therein. The rigid device has a similar hole and the finger has a boss which passes through both holes so as to secure the belt.

2 Claims, 5 Drawing Figures

PATENTED JUN 12 1973 3,737,958

INVENTOR
ERNEST S. SHARAF

QUICK RELEASE LOCKING MECHANISM

This invention relates generally to quick release locking mechanisms and more specifically to an improved quick release locking mechanism for use with chairs, seats and the like.

New federal regulations, particularly those relating to the manufacture and sale of infant car seats, now require that such seats incorporate many safety factors. One of these requirements is the provision of a restraining type of safety belt above and beyond the belt which is supplied with the automobile itself.

The type of locking and release mechanism which is normally used with automobile seat belts is much too cumbersome and expensive to be appropriate for use as an attachment to an infant's car seat.

One of the natural requirements for a locking mechanism for use with an infant car seat is that it be operable by one other than the person sitting in the seat and, primarily, by the person who is in the driver's seat of the car. Therefore, the mechanism must include ease of operation in the attachment of the belt to the mechanism for locking purposes, and the provision of an easily operable quick release device for dropping the belt away from the child in the seat.

Accordingly, it is an object of the present invention to supply a quick release locking mechanism for a restraining belt.

A further object of the invention is to provide such a locking mechanism for use with a seat and, particularly, an infant car seat.

Yet another object of the invention is to provide a quick release locking mechanism which is inexpensive and easily mountable on existing infant car seats.

Yet another object of the invention is to provide a quick release locking mechanism which is simply and easily locked and quickly releasable by a person sitting adjacent to the infant seat in the automobile.

These and other objects of the invention will be obvious from the following description when taken in conjunction with the drawings wherein FIG. 1 is a perspective view of the locking mechanism and free end of the safety belt in the locked position;

Broadly speaking, the invention comprises a quick release locking mechanism for a restraining belt for use with a seat or the like which comprises a rigid means secured to one side of the seat and which extends forwardly of the seat. A finger extends pivotally from the rigid means and is biased by a resilient device in the direction of the support means. The finger and support means include a cooperative latching means which grasps the plate at the terminal end of the seat belt and holds it firmly in place. The belt is dropped by gravitational force when the finger means is moved so as to overcome the bias of the resilient device and thus release the plate.

Figure 4:
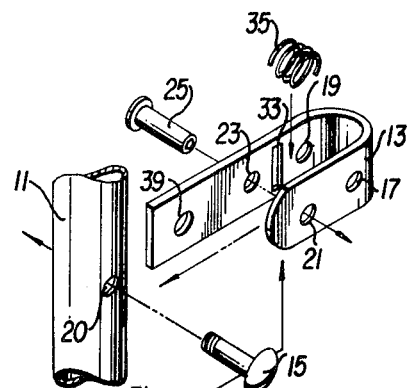
FIG. 4 is an exploded view of the parts of the mechanism.

Turning now more specifically to the drawings, there is shown in partial view one of the upright posts 11 associated with a seat frame such as an infant's car seat used in an automobile. Plate means having two parallel arms, such as that formed by the C-shaped plate 13, is passed about the post 11 and secured thereto by means such as bolt 15. Bore holes 17 and 19, as seen more clearly in FIG. 4, mate with a similar hole 20 in the post 11 so as to provide a mating passageway for the bolt 15.

Further bore holes 21 and 23 are provided at opposite points on the arms created by the C-shaped bracket 13 so as to accept a means such as rivet 25 which passes therethrough. An angled rigid finger 29 is also provided with a bore hole 30 through which the rivet 25 also passes.

Finger 29 terminates at one end in a lip 31 which mates with a slot 33 in one arm of the C-shaped bracket 13. This mating, in effect, provides a pivotal connection between the bracket 13 and the finger 29.

When the bracket and the finger are assembled, there is provided a resilient means such as a spring 35 about the rivet 25 between the finger 29 and the shorter arm of the C-shaped bracket 13. Spring 35 is a compression spring which biases the finger 29 in a direction towards and abutting against the longer arm of the C-shaped bracket 13.

A boss 37, which may be integral with finger 29, extends outwardly therefrom. The boss is shaped so as to mate with a further bore hole 39 in the outer end of the longer arm of the C-shaped bracket 13. Accordingly, when no external pressure is exerted against finger 29, boss 37 will rest within bore hole 39 under the bias of spring 35.

A seat belt 41 terminates at one end in a rigid plate member 49 having a slot 33 therein to accept the belt in a standard manner. The particular plate shown is of a triangular nature and has at its apex a bore hole 47. This bore hole is used to mate with the bore hole 39 in bracket 13 and is of a size to accept boss 37 of finger 29. Accordingly, when the belt is placed in a position such that bore holes 39 and 47 match, and the finger 29 is released, it will effectively lock plate 45 to the post 11.

In order to provide easy and quick access to the finger 29, it is provided with an outer angle section 49. Thus, one only needs to place his finger against the section 49 and press outwardly so as to overcome the bias of spring 35 in order to quickly release the plate 45 of the seat belt 41.

Figure 1:
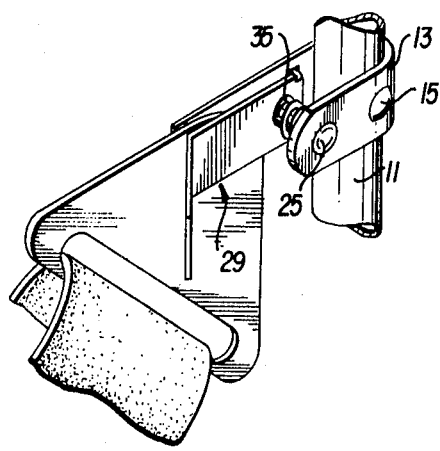
Figure 2:
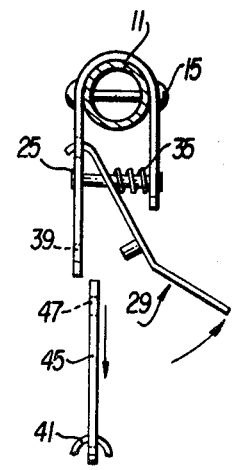
FIG. 2 is a plan view partially in section of the mechanism of FIG. 1 with the lock being held in its release position.
Figure 3:
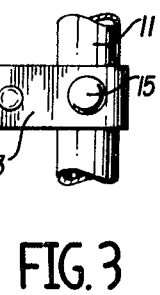
FIG. 3 is a side view of the mechanism as shown in FIG. 1.
Figure 5:
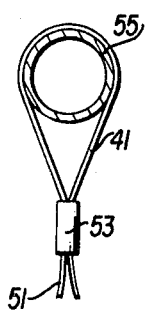
FIG. 5 is a plan view partially in section of the other end of the seat belt as used with the seat.

FIG. 5 shows the other end of the seat belt 41 as it passes around the opposite post 55 of the seat. The belt terminates at end 51 and is held by the usual adjustable clip or the like 53.

As can be seen, the present invention provides a simple, economical yet effective locking quick release mechanism which is readily adaptable to any seat and particularly to any infant's car seat which may either be manufactured or which is in existence today.

It will be understood that the above description and drawings are illustrative only and that various components could be substituted and still remain within the scope of the invention. For instance, there has been shown only a simple pelvis restraint belt. The other type of belt which has become of fairly common usage having both the pelvis and the torso restraint may be used with the present invention merely by hooking the terminal ends at different points on one post and passing it through the plate device as shown. Also the particular means attached to the post of the seat which holds the release mechanism can obviously be geometrically varied and could even be in two separate sections rather than a single C-shaped plate. Accordingly, the invention as described and shown is to be limited only the scope of the following claims.

I claim:

1. A quick release locking mechanism for a restraint belt used with a seat comprising;
   plate means having aligned parallel arms connected to one side of said seat and extending outwardly therefrom;
   a rigid finger pivotally secured at one end to one of said arms and extending outwardly between said parallel arms said finger having an accessible angled end portion opposite said secured end;
   resilient means secured between said finger and the other one of said arms for biasing said finger toward said one of said arms;
   a bore hole in said one of said arms;
   a boss on said finger for mating with said bore hole;
   a rigid plate at the end of said belt; and
   a bore hole in said rigid plate for mating with said boss.

2. The mechanism of claim 1 wherein the means for pivotally mounting said finger comprises;
   a slot in said one of said arms; and
   a lip on said finger of a dimension to fit within said slot.

* * * * *